(12) United States Patent
Khan et al.

(10) Patent No.: US 6,219,782 B1
(45) Date of Patent: *Apr. 17, 2001

(54) MULTIPLE USER SOFTWARE DEBUGGING SYSTEM

(75) Inventors: Azeemullah Khan, Redmond; Glenn T. Noyama, Kirkland; Andrew Michael Pennell, Redmond, all of WA (US)

(73) Assignee: Microsoft Corporation, Redmond, WA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/224,916

(22) Filed: Jan. 4, 1999

Related U.S. Application Data (63) Continuation of application No. 08/841,615, filed on Apr. 29, 1997, now Pat. No. 5,892,941.

(51) Int. Cl.[7] ...................................................... G06F 17/00
(52) U.S. Cl. ........................................... 712/227; 709/203
(58) Field of Search .............................. 712/227; 709/203

(56) References Cited

U.S. PATENT DOCUMENTS

| | | | |
|---|---|---|---|
| 4,231,087 | 10/1980 | Hunsberger et al. | 395/183.01 |
| 5,113,523 | 5/1992 | Colley et al. | 395/800 |
| 5,450,586 | * 9/1995 | Kuzara et al. | 395/700 |
| 5,473,754 | 12/1995 | Folwell et al. | 395/183.21 |
| 5,557,539 | 9/1996 | Fitch | 364/514 B |
| 5,561,763 | * 10/1996 | Eto et al. | 395/182.11 |
| 5,612,898 | 3/1997 | Huckins | 364/514 R |
| 5,615,332 | 3/1997 | Yamamoto | 395/183.14 |
| 5,652,869 | 7/1997 | Herdeg et al. | 395/500 |
| 5,787,245 | * 7/1998 | You | 395/183.14 |
| 5,794,046 | * 8/1998 | Meier et al. | 395/704 |
| 5,812,768 | * 9/1998 | Page et al. | 395/200.09 |
| 5,815,653 | * 9/1998 | You et al. | 395/183.14 |
| 5,819,092 | * 10/1998 | Ferguson et al. | 395/701 |
| 5,819,093 | * 10/1998 | Davidson et al. | 395/701 |
| 5,844,553 | * 12/1998 | Hao et al. | 345/329 |

* cited by examiner

*Primary Examiner*—David Y. Eng
(74) *Attorney, Agent, or Firm*—Woodcock Washburn Kurtz Mackiewicz & Norris LLP

(57) ABSTRACT

A minimally intrusive debugging system for use by multiple users for concurrently and independently debugging a common software target in a client and server debugging environment. The target software is a non-compiled interpreted script-type program that is individually controlled by independent client debugging sessions. Each debug engine in the client's debugging session is used to control the target software program using debug system library interface calls that are integrated into the executing target software program. The debug system library interface calls facilitate communication of target system program events to the client's debug engine and to extract internal operational information from said target software program by the client debug engine and target software program interface on each client computing device.

24 Claims, 5 Drawing Sheets

MULTIPLE USER SOFTWARE DEBUGGING SYSTEM

RELATED CASES

This is a continuation of application Ser. No. 08/841,615, filed Apr. 29, 1997, now U.S. Pat. No. 5,892,941 issued Apr. 6, 1999 which is hereby incorporated by reference.

FIELD OF THE INVENTION

This invention relates to the field of software debugging systems and in particular to a system for multiple users to independently and simultaneously debug a common server based software target.

PROBLEM

Existing software debugging techniques are readily available for single user debugging of a single target software system. The typical debugging tool is a static debug tool that requires exclusive control of the target software being debugged. Single user debugging means that only one user can have active debugging access to the target software at a time. A static debug tool is one that facilitates either controlled stepwise execution of individual program instructions and/or periodic breakpoint execution of target software sections. Using either the stepwise or periodic breakpoint debugging technique, normal execution of the target software is frozen at prescribed execution intervals to allow user inspection of the target system's internal data including, but not limited to, memory locations, registers, and/or instruction address sequences. The user debugging the target software determines whether the target software is operating as expected by inspecting the memory and registers of the halted target software. Such a debugging technique presents a variety of difficulties for multiple users simultaneously debugging a common software target.

For example, one key problem is that single user debugging techniques are limiting in that only one user can uninterruptedly debug the target software at a time due to the highly intrusive nature of the existing debug tools. Even if the user debugging a target software is only debugging one small object of the target software, processing for the entire target software is halted when a prescribed execution interval or breakpoint is reached. The target software does not resume executing subsequent instructions until the controlling user manually releases the target software. Multiple users can only be afforded an uninterruptable debugging environment if the target software is duplicated on an independent debugging environment for each one of the multiple users.

For the above reasons a multiple user debugging tool is desirable that allows multiple user access to simultaneously and uninterruptedly debug a common software target. A multiple user debugging tool of this type has heretofore not been realized prior to the present disclosure.

SUMMARY

The above identified problems are solved and a technical advance achieved in the field by the multiple user software debugging system of the present invention. The multiple user software debugging system facilitates a minimally intrusive debugging environment, preferably a client and server computing environment, that controls execution of target software by participating as part of the actual target software system activity concurrently with, but without directly affecting, other of the multiple users of the same target software. The multiple user software debugging system comprises integrating at least one of a plurality of debug interface calls into the target software itself. The target software is a server based computer program. Additional steps include loading a debug interface library containing a plurality of debug interfaces for use by the target software and the debug engine, wherein at least one of the plurality of debug interfaces is loaded as an operational component of the target software. A final step includes executing the target software under minimally intrusive control of the debug engine by way of the debug interfaces in a concurrent manner for each of the multiple users.

The debugging system establishes at least one thread connection for communication between said target software and said debug engine. The thread is used during target software execution by calling at least one of the plurality of debug interfaces from the target software for each executable target software statement to notify the debug engine of target software events, and retrieving internal target software operating information by said debug engine. The debug interfaces available to the target software and the debug engines include, but are not limited to, an initialization interface, an execution interface, a symbol handling interface, an error handling and termination interface, and a resource management interface.

DETAILED DESCRIPTION

Figure 1:
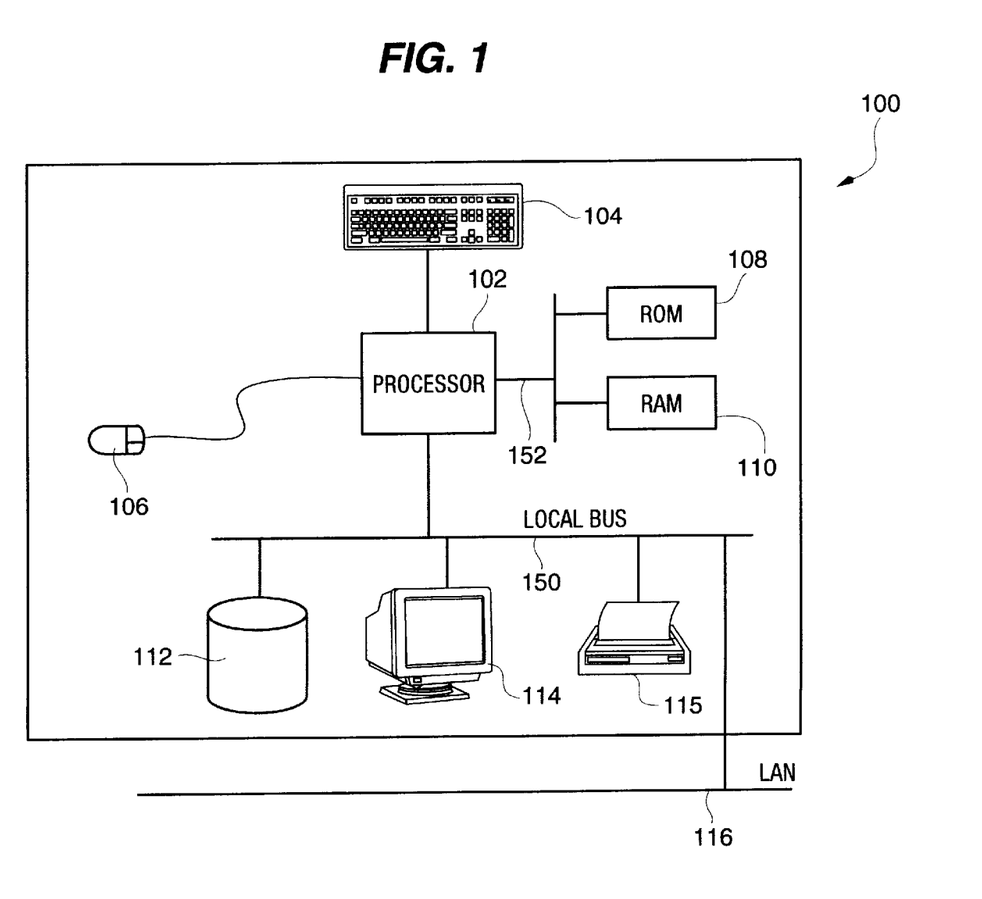
FIG. 1 illustrates a typical computing and debugging environment in block diagram form used by multiple users.

Multiple User Computing Environment—FIG. 1

FIG. 1 illustrates a block diagram example of a computer system 100 in a multiple user debugging environment. The multiple user debugging system of the present invention is operable in any of several standard computing systems readily available in the industry such as computer system 100. The target software, the debugging system, and any other programmed instructions and/or commands for the debugging system are executable on processor 102. Processor 102 stores and/or retrieves programmed instructions and/or data from memory devices that include, but are not limited to, Random Access Memory (RAM) 110 and Read Only Memory (ROM) 108 by way of memory bus 152. Another accessible memory device includes non-volatile memory device 112 by way of local bus 150. User input to computer system 100 is entered by way of keyboard 104 and/or pointing device 106. Human readable output from computer system 100 is viewed on display 114 or in printed form on local printer 115. Alternatively, computer system 100 is accessible by remote users for debugging, input, and/or generating human readable displays in printed and/or display screen output form or any other output form by way of Local Area Network (LAN) 116.

Figure 2:
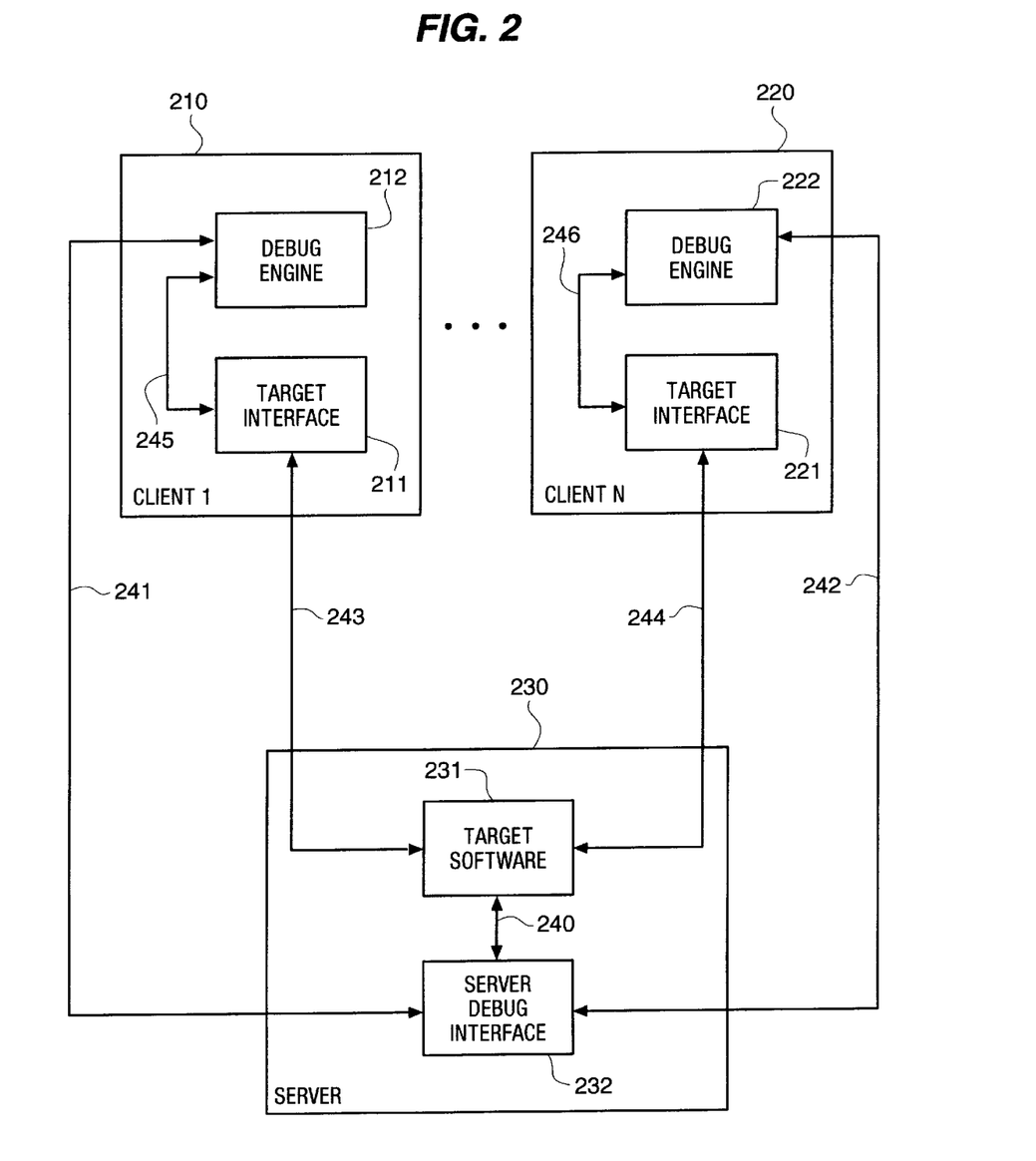
FIG. 2 illustrates process configuration in block diagram form for a multiple user debugging environment.

Process Configuration—FIG. 2

FIG. 2 illustrates a process configuration for the multiple user debugging system 200 having client processes 210 and 220, and server process 230. Client processes 210 and 220 respectively include, but are not limited to, a target interface 211 and 221, and a debug engine 212 and 222. Server process 230 includes, but is not limited to, a target software process 231 and a Server Debug Interface (SDI) 232.

The SDI 232 is operatively connected to the target software process 231 by communication path 240, and to each debug engine 212 and 222 by communication paths 241 and 242 respectively. Each debug engine 212 and 222 is operatively connected to the respective target interfaces 211 and 221 by communication paths 245 and 246 respectively. The target interfaces 211 and 221 on clients 210 and 220 are operatively connected to the target software 231 on server 230 by communication paths 243 and 244 respectively.

The debug interface 232 interacts with the target software 231 to notify client debug engines 212 and 222 of processing events on the target system 231, and to provide a way for each client's debug engine 212 or 222 to control the execution flow of the server target engine 231 as needed. The server's debug interface 232 is also used to exchange symbol table information between the target software 231 and each client's debug engine 212 and/or 222 to facilitate internal data inspection by way of each client's debug engine 212 or 222.

Figures 3, 4:
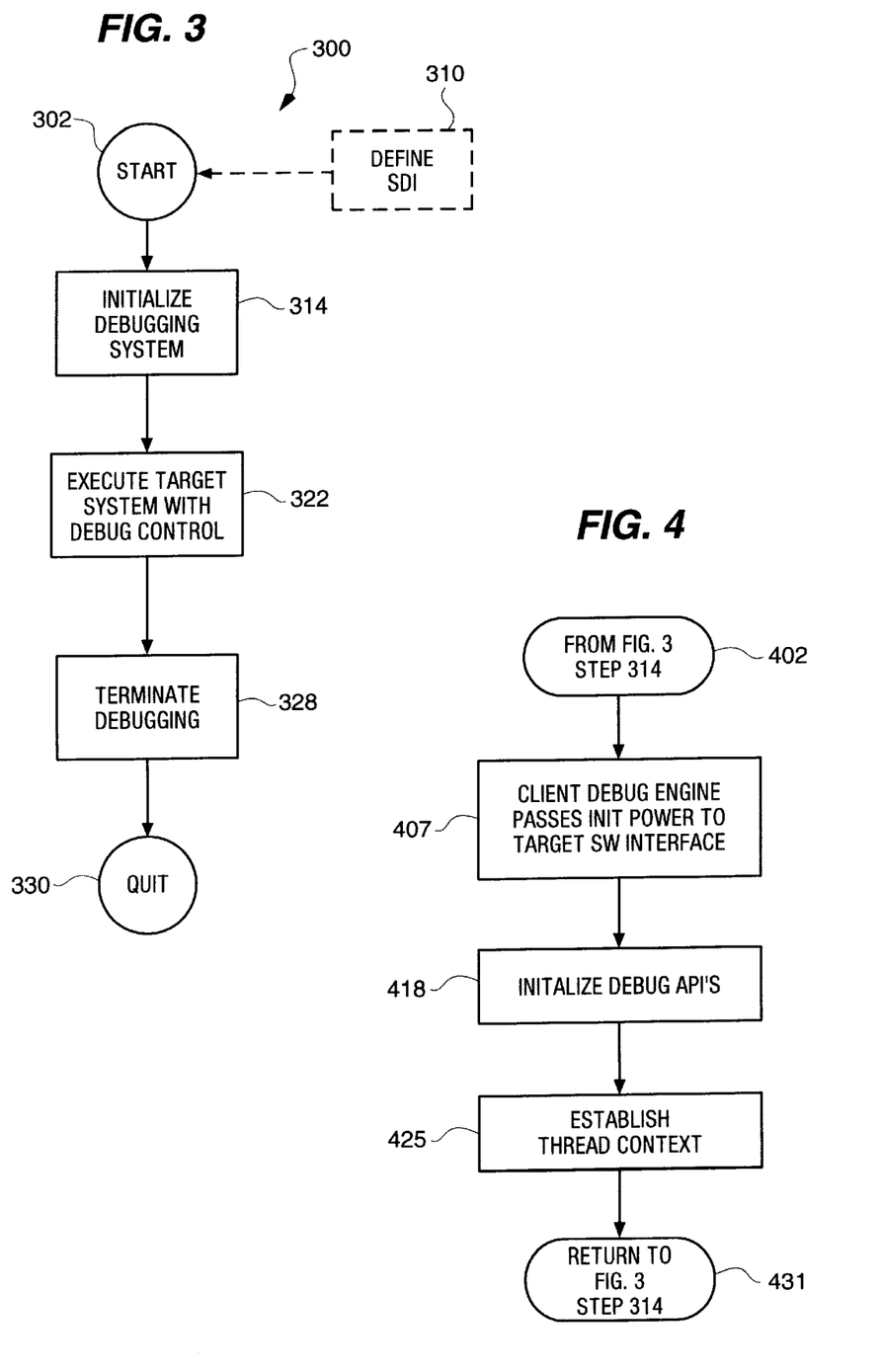
FIG. 3 illustrates an overview of the multiple user debugging system operational steps in flow diagram form.
FIG. 4 illustrates initialization steps in flow diagram form.

Debugging System Operational Steps—FIG. 3

FIG. 3 illustrates an overview of the debugging system operational steps 300 in flow diagram form. The debugging system begins at step 302 and is preceded at least once by a debug system interface definition phase at step 310. An example detailing a set of debug system interface definitions from step 310 are disclosed in the text below accompanying FIG. 3 step 310.

At step 314 the multiple user debugging system is initialized for operational use. Details of the debugging system initialization at step 314 are disclosed in the text accompanying FIG. 4. Operational debugging occurs at step 322 by executing the target software under the control of the debugging system. Details of the operational debugging process at step 322 are disclosed in the text accompanying FIG. 5. Terminating the debugging system for an individual one of the multiple users debugging the target software occurs at step 328, and debug processing is complete at step 330. Details of debugging system termination at step 324 are disclosed in the text accompanying FIG. 6.

Debugging System Interface Definitions

The examples below illustrate sample debugging system interface definitions as are generated at FIG. 3 step 310. Debugging system interface definitions include interface definitions for the Server Debug Interface (SDI) 232, and the Application Program Interfaces (API) 211 and 221 for use by individual clients 210 and 220 to communicate with the target software 231.

The SDI interface 232 is a Dynamic-Link Library (DLL) and set of callbacks that are loaded at debug system initialization time at step 314, and then called by the target software 231 at the time each instruction of the target software 231 is executed. The callbacks comprise a set of functions that are implemented by the target software 231 to be used by the SDI 232 for purposes that include, but are not limited to, inspection and modification of symbolic information.

The specific data structures and data types defined in the DLL are unique to the target software yet accommodate the informational needs of the debug system. Each data structure in the DLL can be customized subject to the architecture of the target software being debugged and the flexibility of the language upon which the target software is based. An example of the data structures and data types for a Structure Query Language (SQL) server application includes, but is not limited to, the definitions listed below.

Global Variables

1) ULONG INTV—where INTV is the INTerface Version of the SDI interface 232. The INTV can include or consist of a date and time-of-day data. The INTV can be used by the initialization routine to verify compatibility between SDI 232 and the target software 231.

2) ULONG IMPV—where IMPV is the IMPlementation Version of the SDI interface 232. The IMPV can include or consist of alpha and/or numeric version identification data. The IMPV can be used by the initialization routine to identify and/or verify what set of client API interfaces the SDI interface 232 supports.

3) ULONG SPID—where SPID is the Stored Procedure IDentification number for a unique connection ID that is the number assigned to every connection to target software 231 made by target interfaces 211 and 221. At any given instance in time there can never be two connections with the same identification number.

4) ULONG PRID—where PRID is the unique PRocedure IDentification number for a stored procedure of the debugging system.

5) ULONG IDX—where IDX is a numeric InDeX to the next target software program instruction or Stored Procedure program instruction in queue for execution by the host processor 102. The IDX is 1 for a Stored Procedure statement that is the first line. For a batch, which is a set of SQL statements submitted together and executed as a group, it is 0.

6) USHORT NLVL—where NLVL is the present Nesting LeVeL of the next server target application program instruction queued for execution by the host processor 102.

7) struct__SQLFNTBL SQLFNTBL—where SQLFNTBL is the SQL Function TaBLe data structure that defines the list of addresses of callback functions supported by the present version of target software 231 which may be called by the SDI 232. An example of the SQLFNTBL data structure can include:

```
typedef struct__SQLFNTBL {
        pfnSDIGetLastError  SDIGetLastError;  // Get the
last Server error
        pfnSDIGetSym        SDIGetSym;        // Get a
specified symbol category
        pfnSDISetSym        SDISetSym;        // Set the value
of a set of symbols
        pfnSDIDbgOff        SDIDbgOff;        // Turn SQL
                                              Debug
mode off
    }SQLFNTBL, *PSQLFNTBL;
```

8) struct__DBGFNTBL DBGFNTBL—where DBGFNTBL is the Global FunctioN TaBLe data structure that defines the list of addresses of callable functions supported by the present version of the SDI 232. The SDI 232 provides the DBGFNTBL data structure to the target software 231 at initialization time. An example of the DBGFNTBL data structure for an SQL target application can include:

```
typedef struct__DBGFNTBL   {    // function table filled in
by debug DLL
    pfnSDINewConnection    SDINewConnection; // Notify new
connection
```

-continued

```
    pfnSDINewSP          SDINewSP;  // Notify load of new
SP
    pfnSDIStep           SDIStep;   // Notify of new statement
execution
    pfnSDINewBatch       SDINewBatch; // Notify of batch cmd
loaded
    pfnSDIPvAlloc        SDIPvAlloc;   // Resource -
allocate memory
    pfnSDIPvAllocZ       SDIPvAllocZ;  // Resource -
allocate 0 filled
    pfnSDIPvRealloc      SDIPvRealloc; // Resource -
reallocate
    pfnSDIFreePv         SDIFreePv;    // Resource - free
resource
    pfnSDIPop            SDIPop; // Pop level of execution-
stack walking.
    PfnSDICloseConnection  SDICloseConnection; //
Connection close
                                                    cleanup
resources.
    PfnSDISpidContext    SDISpidContext; // Notify client
thread context.
}DBGFNTBL, *PDBGFNTBL;
```

9) struct_SYMINFO SYMINFO—where SYMINFO is the SYMbol INFOrmation data structure used by 232 to retrieve symbol table information from the target software 231. The SYMINFO data structure definition can include:

```
    typedef struct_SYMINFO {
        SYM_TYPE   st;           // symbol type
        void       *pv;          // pointer to symbol
value
        USHORT     cb;           // length
        USHORT     cbName;       // length of name
        char       *Name;        // symbol name
        BYTE       cbPrec;       // precision
information
        BYTE       cbScale;      // scale information
    }SYMINFO, *PSYMINFO;
```

10) long SDI_EC—where SDI_EC is the SDI Error Code data structure for return values from functions defined in the DBGFNTBL data structure. Examples of the SDI_EC error codes can include:

```
enum SDIErrors   {               // possible error codes
        SDI_OK,                  // looking good
        SDI_USAGE,               // invalid parameter etc. should
never happen
        SDI_VERSION,             // version mismatch; cannot
proceed
        SDI_OUT_OF_MEMORY,       // out of memory
        SDI_SYM_NOTFOUND,        // invalid sym name
        SDI_INVALID_SYMTYPE,     // invalid sym type
        SDI_INVALID_SYMVAL,      // invalid sym value
        SDI_INVALID_SPID,        // invalid spid
        SDI_SHUTDOWN,            // code set during SDIDbgOff
        SDI_MAX                  // last known code
};
```

Client Program Interfaces

The individual client APIs 211 and 221 of the multiple user debug system 300 include, but are not limited to, APIs for connecting and interacting with the target software 231.

Server Debug Interfaces (SDI)

The Server Debug Interfaces 232 of the multiple user debug system 300 include five interface categories including, but not limited to, an initialization API, execution control API, symbol handling API, error handling and shutdown API, and resource management API. In each of the interface categories certain of the interfaces define input buffers and output buffers. As a general rule, output buffers have small size definitions because the debugging data in the output buffers is typically short lived and it is the called process' responsibility to copy the output buffer data on a timely basis to free the output buffer for new debugging data. The data is copied over and sent to debug engines 212 and 222 for purposes that include, but are not limited to, display to user for inspection and modification. Managing the respective input buffers is the responsibility of the calling process.

Initialization API

SDIAPI BOOL SDIInit (SQLFNTBL *psqlfntbl, INTV intvsql, DBGFNTBL **ppdbgfntbl, INTV *pintvdbg)

Return Values

TRUE if successful, FALSE otherwise.

Parameters psqlfntbl [Input] Pointer to the helper function table that is exported by SQL server for use by SDI.

intvsql [Input] Version signature. LOWORD indicates the MAJOR server version and the HIWORD indicates the MINOR server version.

**ppdbgfntbll [Output] Pointer to memory table allocated by SQL Server to be initialized by SDI and returned.

*pintvdbg [Output] Signature of DEBUGGER version id.

Execution Control API

BOOL SDINewSPID( SPID *spid,* char *szSqlserver*[*cbSqlSrvrMax*], char *szMachine* [*cbMchNmMax*], PID *pid,* PID *dbgpid*)

Return Values

TRUE if successful, FALSE otherwise.

Parameters spid [Input] SQL Server Process Id for connection.

szSqlServer[cbSqlSrvrMax] [Input] Name of SQL Server.

szMachine[cbMchNmMax] [Input] Name of requesting machine pid [Input] Process id associated to connection. This is defined by the operating system.

dbgpid [Input] Process Id of debugger. This id is registered by the Debugger via ODBC or DBLib.

BOOL SDINewSP (SPID *spid,* char *\*DBName,* USHORT *DBLen,* PRID *prid,* NLVL *nlvl*)

Return Values

TRUE if successful, FALSE otherwise.

Parameters spid [Input] SQL Server Process ID.

*DBName [Input] Name of Database for Stored Procedure.

DBLen [Input] Length of Database Name.

prid [Input] Procedure Id of SP.

nlvl [Input] Current execution nesting level; used for callstack support.

BOOL SDIStep (SPID *spid,* PRID *prid,* IDX *idx,* OFF *off,* NLVL *nlvl*)

Return Values

TRUE if successful, FALSE otherwise.

Parameters spid [Input] SQL Server Process ID prid [Input] Procedure Id. If current execution is a batch statement then this parameter will be NULL. And Line idx will be undefined.

idx [Input] Line index; 0 based off [Input] Char offset of statement (used for

-continued

```
        batch statements). Only valid if prid is NULL.
    nlvl [Input] Current execution nesting level.
BOOL SDINewBatch(SPID spid, char *CmdBuf, ULONG cbCmdBuf,
NLVL nlvl)
    Return Values
        TRUE if successful, FALSE otherwise.
    Parameters
        spid [Input] SQL Server Process ID.
        *CmdBuf [Input] pointer to Batch command /
statement.
        cbCmdBuf [Input] size of statement in bytes.
        nlvl [Input] Current Execution nesting level.
BOOL SDIPop(SPID spid, NLVL nlvl)
    Return Values
        TRUE successful, FALSE otherwise.
    Parameters
        spid [Input]    SQL Server Process Id.
        nlvl [Input] Current execution nesting level.
BOOL SDICloseConnection(SPID spid, ULONG sqlerror, SDI_EC
sdierror)
    Return Values
        TRUE if successful, FALSE otherwise.
    Parameters
        spid [Input] SQL Server Process Id.
        sqlerror [Input] Errors associated with the
        connection. Like return code.
        sdierror [Input] SDI errors associated to the
        connection. Like a return code.
BOOL SDISpidContext (SPID spid, PID pid, THID thid)
    Return Value
        TRUE if successful, FALSE otherwise.
    Parameters
        spid [Input] SQL Server Process ID.
        pid [Input] Debuggee process ID.
        thid [Input] Debuggee current thread id.
```

Symbol Handling API

```
BOOL SDIGetSym (SFID spid, SYMS syms, PSYMINFO
*prgsyminfo, USHORT *pcsym)
    Return Values
        TRUE if successful, FALSE otherwise.
    Parameters
        spid [Input] SQL Server Process ID that we
        would like information on.
        syms [Input] enumerate defining the class of
        symbols to retrieve information on.
        *prgsyminfo [Input] Pointer to an array of
        symbols to retrieve.
        *pcsym [Input] Pointer to a count of symbols.
BOOL SDISetSym (SPID spid, SYMS syms, PSYMINFO psyminfo)
    Return Values
        TRUE if successful, FALSE otherwise.
    Parameters
        spid [Input] SQL Server Process ID.
        syms [Input] Enumerate Symbol class.
        psyminfo [Input] Pointer to symbol information
to set values from.
```

Error Handling and Shutdown API

```
BOOL SDIDbgOff (SPID spid)
    Return Value
        TRUE if successful, FALSE otherwise.
    Parameters
        spid [Input]   SQL Server process ID.
SDI_EC SDIGetLastError (void)
    Return Values
        SDI_OK              Success
        SDI_USAGE           Invalid parameter
        SDI_VERSION         Version mismatch
        SDI_OUT_OF_MEMORY   Out of memory to
```

-continued

```
                            complete request
        SDI_SYM_NOTFOUND    Symbol requested could
                            not be found ( by name )
        SDI_INVALID_SYMTYPE Symbol type requested
                            invalid.
        SDI_INVALID_SYMVAL  Value for symbol invalid
        SDI_INVALID_SPID    SQL Server process ID
                            invalid or unknown
        SDI_SHUTDOWN        Code set during
                            SDIDbgOff
```

Remarks
SDIGetLastError is exported by SQL Server and called by the SQL Debugger (SDI) to retrieve information on the last known failure return code.

Resource Management API

```
void * SDIPvAlloc (size_t cb);
    Return Value
        Pointer to memory if successful, otherwise NULL.
    Parameters
        cb [Output] Number of bytes to allocate.
    Remarks
        SDIPvAlloc is exported by the SQL Debugger (SDI)
        for use by SQL Server to isolate resources
        consumed for debugging by SQL Server. It is
        assumed that the SQL Debugger (SDI) will
        maintain and manage its own heap, separate from
        SQL Server. All memory allocation required for
        symbol and other information will be retrieved
        via this API. Memory allocated via this function
        should be freed via SDIFreePv( )
void * SDIPvAllocZ (size_t cb)
    Return Value
        32 bit pointer to memory if successful, NULL
otherwise.
    Parameters
        cb [Input] Number of bytes to allocate.
    Remarks
        SDIPvAllocZ is exported by SQL Debugger(SDI) for
        use by SQL Server, memory block allocated will
        be zero filled at allocation time (synonymous
        with calloc). Memory allocated via this function
        should be freed via SDIFreePv( ).
void * SDIPvRealloc (void *pv, size_t cb)
    Return Value
        32 bit pointer to memory if successful, NULL
otherwise.
    Parameters
        pv [Input] pointer to memory block to realloc.
        cb [Output] New size of buffer in bytes.
    Remarks
        SDIPvRealloc is exported by SQL Debugger(SDI)
        for use by SQL server and has the same semantics
        as CRT function realloc. Memory allocated via
        this function should be freed via SDIFreePv( )
void SDIFreePv (void *pv);
    Parameters
        *pV [Input] Pointer to memory block to free.
    Remarks
        SDIFreePv is exported by SQL Debugger(SDI) for
        use by SQL Server to free memory allocated by
        SDIPvAlloc, SDIPVAllocZ, and SDIPvRealloc.
```

Debugging System Initialization—FIG. 4

FIG. 4 illustrates the debugging system initialization steps 400 in flow diagram form. The debugging interface definition steps 400 begin at step 402 and disclose the details of step 314 from FIG. 3. At step 407, the debug engine for a given client, for example debug engine 212 for client 210, calls a private interface in target software interface 211 to pass a pointer to a data structure that contains information needed to start the debug system initialization process including, but not limited to, a client machine name, a client Process Identification (PID), a debugger PID, and debugger specific information. An example of a call that would be issued by a client to initialize a server debugging session is sp_sdidebug ('on', '<client machine name>', <client PID>, <debugger PID>, <debugger specific info>).

At step 418, the sp_sdidebug 'on' call invokes the initialization Server Debugging Interface API SDIInit( ) after loading the Server Debug Interface (SDI) DLLs. The SDIInit( ) API performs initialization tasks including, but not limited to, API version checking, and exchanging function tables between client and server to facilitate event notification for events occurring during execution of the target software.

Once the debugging system is enabled at step 425, for client 210 in the present discussion, the client's thread context is passed to the target software 231 using the CONTEXT parameter of the stored procedure sp_sdidebug. A thread is an interprocess communications technique that is well known in the distributed computing art. More generally, a thread is a communications channel or communications means between two processes such as between a client process and a server process in a distributed computing environment, and multiple threads can be established between the same client process and server process. In a preferred embodiment of the present invention, a single thread is used for each connection between a client process and a server process in the interest of simplicity and subject to the availability of operating system resources to support the potentially large number of threads. An example of a call to invoke passing the thread context information, including a Thread IDentification (TID) from the client to the server, is sp_sdidebug ('context', <client PID>, <client TID>).

Once the thread context is established at step 425, the initialization is complete at step 431 and processing returns to the process flow disclosed in FIG. 3.

Figure 5:
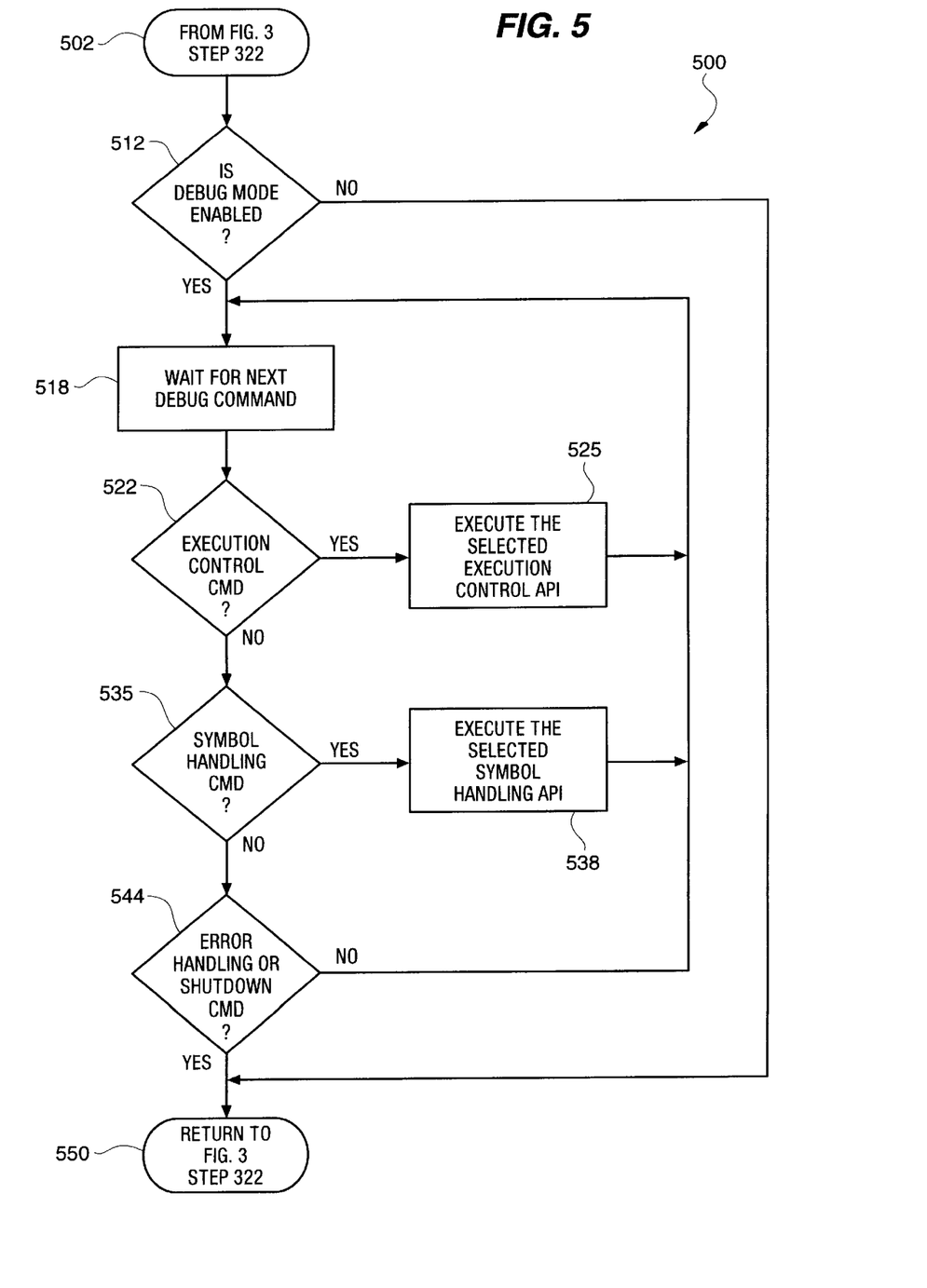
FIG. 5 illustrates active debugging operational steps flow diagram form.

Debug Processing—FIG. 5

FIG. 5 illustrates the operational debug processing steps 500 that occur following initialization of the multiple user debug debugging system of the present invention. The processing steps 500 begin at step 502 and represent the details of overview step 322 of FIG. 3.

If at decision step 512 the debug mode of the debugging system is not enabled, then processing continues to step 550 where the operational debug processing steps 500 return to the next step following overview step 322 of FIG. 3. If it is determined at decision step 512 that the debug mode for the debugging system is enabled, then processing continues at step 518 where the debugging system waits for a debug command from either the client's debugger such as debug engine 212, or from the target software 231 itself.

If at decision step 522 the debug command is a target software execution control API, then processing continues to execute the present execution control API at step 525 prior to returning to wait for a next debug command at step 518. An execution control API is called by the target software 231 from a selection of execution control API's including, but not limited to, SDINewSPID, SDINewSP, SDIStep, SDINewBatch, SDIPop, SDICloseConnection, and SDISpidContext.

The SDINewSPID API is called by the target software 231 whenever a request for a client debugging connection is made. The API passes a Connection Id, the name of the target software server, the client machine name, the client PID, the debug engine PID, and additional debugger specific information. A new PID is established for the resulting target software server connection.

The SDINewSP API is called by the target software 231 prior to executing a Stored Procedure (SP) on behalf of a client connection that has debug mode enabled.

The SDIStep API is called by the target software 231 prior to executing a target software program step or stored procedure step on behalf of a client connection that has debug mode enabled. This API allows the client debugger time to access information specific to this thread of execution on a step by step program execution basis including, but not limited to, symbol information for local variables, procedure parameters, and global variables.

The SDINewBatch API is called by the target software 231 prior to executing multiple target software program steps on behalf of a client connection that has debug mode enabled. This API allows the client debugger time to access information specific to this thread of execution including, but not limited to, symbol information for local variables, procedure parameters, and global variables.

The SDIPop API is called by the target software 231 when a current target software programing nest level is exited. This API facilitates the building of runtime callstacks during program execution and profiling.

The SDICloseConnection API is called by the target software 231 prior to disconnecting a client thread connection. System cleanup of connection resources also takes place up on executing this API for resources that include, but are not limited to, memory garbage collection.

The SDISpidContext API is called by the target software 231 in response to a request by the Debug engine to set the current context of a thread connection. Information provided by this API is useful for client debuggers to track and associate connection information with information that the debugger has in its native form. The client debuggers 212 and 222 can associate a specific thread of execution in 211 or 221 with the connection being debugged.

If at decision step 522 the debug command is not a target software execution control command, then processing continues to decision step 535. If at decision step 535 the debug command is a symbol handling command, then processing continues to execute the present symbol handling API at step 538 prior to returning to wait for a next debug command at step 518. A symbol handling API is called by any one of the client debug engines from a selection of symbol handling API's including, but not limited to, SDIGetSym, and SDISetSym.

The SDIGetSym API is called by a client debug engine to request information about a class of symbols during a pause in processing resulting from either SDIStep or SDIBatch as disclosed above. The symbol information can be retrieved individually or as a batch fetch. The symbol classes are defined in an SDI header file in a form, for example, as in the following enumerate:

typedef enum {symGlobals, symLocals, symParams}SYMS;

Symbols are typically in classes including, but not limited to, global variables, parameters to stored procedures, and local variables. However, retrieving information about local variables and parameters are different from retrieving global variables. In the case of locals and parameters, the debugger engine requests the information and the target software defines the amount of information involved and allocates resources necessary to buffer the information. In the preferred embodiment, the buffers are under the control of and freed by the debugger and not the target software. Memory for the buffers are allocated out of a resource API that is exported by the debugger engine.

Global symbol information is gathered individually and not by batch. The Server Debugger Interface 232 defines the names of the global symbols that are being requested, and allocates the memory to buffer the information.

The SDISetSym API is called by the Server Debug Interface (SDI) 232 to set the value of local variables and parameters. Setting of global variables is not permitted in the case of SQL Server but may be possible in other scenarios.

Example Debug Session

Consider the case where a user wishes to debug a stored procedure or an application that connects to target software and executes a stored procedure. The user sets a breakpoint in the stored procedure and starts debugging in a manner similar to traditional single user debugging a single target software system. When the new connection is made to target software 231, the target software loads SDI 232 and calls methods SDIInit and SDINewSPID. Before the stored procedure is executed by the target software 231, the target software notifies the SDI 232 about the stored procedure and the statement to be executed by calling SDINewSP and SDIStep. This information is relayed to the debug engine on the client machine which displays to the user the line of program code about to be executed. The user is free to view any locals of parameters at this time. This is accomplished by using the callback interface SDIGetSym. The thread in the target software 231 is in the meantime suspended until the user wishes to continue. Before continuing the user has a chance to modify symbolic information. In this case the callback function SDISetSym is used to make the changes. When the user resumes execution the Server Debug Interface releases the suspended target software thread to continue execution. Connections from other client machines continue execution in target software 231 normally as they run on different threads. When the connection is closed the target software calls SDICloseConnection to notify the Server Debug Interface. A user stops debugging as one would do in a single user debugging system.

Figure 6:
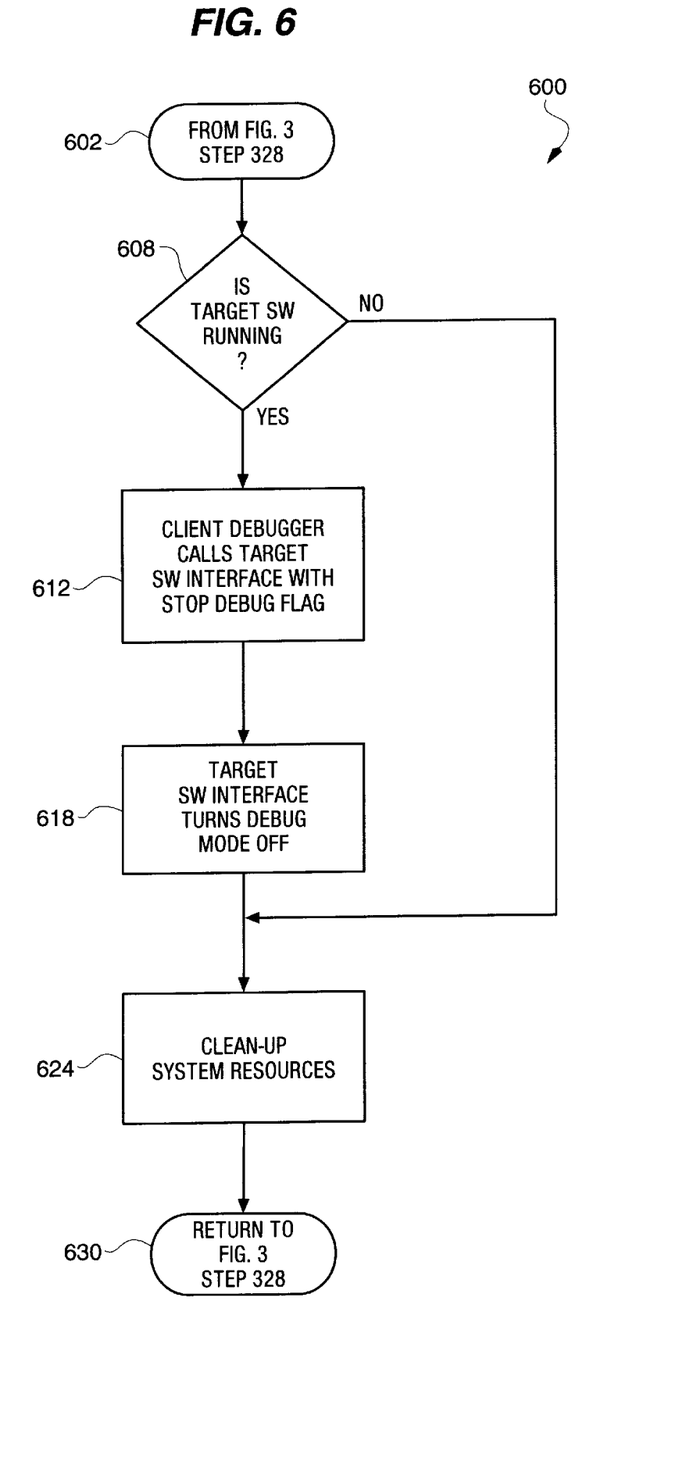
FIG. 6 illustrates debugging system termination steps in flow diagram form.

Debugging System Termination—FIG. 6

FIG. 6 illustrates the error handling and termination steps 600 for the multiple user debugging system of the present invention. The termination steps 600 begin at step 602 and represent the details of overview step 328 of FIG. 3.

If it is determined at decision step 608 that the target software 231 is not running, then processing continues at step 624 where system resources consumed during debugging are released and termination processing ends at step 630. Alternatively, if at decision step 608 the target software 231 is running, then processing continues at step 612.

At step 612 the client debugger 212 initiates a private interface call to its target software interface 211 to request that debugging be terminated. In response to the action of step 612, the target software interface 211 executes the sp_sdidebug ('off') to turn the debug mode off. At step 624, system resources consumed during debugging are released and the termination processing ends at step 630.

SUMMARY

The debugging system of the present invention includes a method and apparatus for a multiple user software debugging system having a minimally intrusive debugging environment for a non-compiled scripted software target in a client and server computing environment where execution control of the target software exists by the debugging system participating as part of the actual target software system activity without disrupting concurrent debugging activity by the multiple users of the target software. Although specific embodiments are disclosed herein, it is expected that persons skilled in the art can and will design alternative multiple user debugging systems that are within the scope of the following claims either literally or under the Doctrine of Equivalents.

What is claimed is:

1. A debugging system for allowing multiple users to simultaneously debug a target software program which executes under a single process in an environment that supports plural processes, each of said processes having associated therewith an address space accessible from within the process, the debugging system comprising:

at least one debug interface call loadable into in the address space of the single process under which said target software program executes, said debug interface call comprising executable code, whereby the address space of said target software program is accessible to said debug interface call without interprocess communication and whereby said debug interface call obtains information about said target software program from said address space without performing interprocess communication; and a plurality of user debug engines controlled by at least two different users, each of said debug engines being communicatively coupled to said single process, said debug engines concurrently communicating a set of debug commands to the target software program by way of said at least one debug interface call and receiving responses from the target software program, said debug commands including a command that requests at least some symbol information from said target software program.

2. The system of claim 1, further comprising a debug interface library including a plurality of debug interface calls, said debug interface call being selected from said library, wherein the debug interface library provides an interface call that facilitates communication between the target software program and at least one of the plurality of user debug engines.

3. A computer-readable medium having computer-executable instructions for performing a method for enabling multiple users to debug a target software program executing under a process having an address space, the method comprising:

receiving a first initialization call from a first user into said process;

loading a debug interface into the address space of said process in response to the first initialization call, said debug interface comprising computer instructions which are executable within said process, said computer instructions including an execution call which receives as a parameter an index into the target software program and which notifies users that a portion of the target software program corresponding to said index has been executed;

the target software program issuing a first execution call prior to execution of a first portion of the target software program, said first call being parameterized by a first index indicative of said first portion, whereby said debug interface is apprised of the execution of said first portion of the target software program without interprocess communcation;

sending a first notification from the debug interface to the first user in response to the first execution call;

receiving a first callback from the first user into the debug interface in response to the first notification, said first callback having first parameters;

executing the first portion of the target software program based on said first parameters;

receiving a second initialization call from a second user different from said first user into said process;

the target software program issuing a second execution call prior to execution of a second portion of the target software program, said second call being parameterized by a second index indicative of said second portion, whereby said debug interface is apprised of the execution of said second portion of the target software program without interprocess communcation;

sending a second notification from the debug interface to the second user in response to the second execution call;

receiving a second callback from the second user into the debug interface in response to the second notification, said second callback having second parameters; and executing the second portion of the target software program based on said second parameters.

4. The computer-readable medium of claim 3, wherein the method further comprises:

establishing a first communication thread for the first user in response to the first initialization call, wherein said first notification and said first callback are communicated by way of said first communication thread; and establishing a second communication thread for the second user in response to the second initialization call, wherein said second notification and said second callback are communicated by way of said second communication thread.

5. The computer readable medium of claim 3, wherein the debug interface computer instructions further comprises an information call which is callable by users and which obtains information about said target software program from the process address space and provides the obtained information to a requesting user, and wherein the method further comprises:

receiving a first information call from the first user into the debug interface loaded into said process;

in response to said first information call, obtaining first information about said target process from the address space of said process without using interprocess communication;

sending said first information from the debug interface to the first user in response to the first information call;

receiving a second information call from the second user into the debug interface loaded into said process;

in response to said second information call, obtaining information about said target process from the address space of said process without using interprocess communication;

sending said second information from the debug interface to the second user in response to the second information call.

6. A computer-readable medium having computer executable instructions to perform a method for debugging a target software program in an environment supporting plural processes each having an address space and plural execution threads within each process, said method comprising:

executing said target software program under a single process on at least two different threads, with a debug interface loaded into the address space of said process under which said target software program executes, said debug interface comprising first computer-executable instructions which retrieve information about the execution of said target software program from said address space, the executing step including said target software program issuing a call to said debug interface; and in response to the act of issuing a call to said debug interface, communicating first information about said target software program, by way of said debug interface, to a plurality of debug engines wherein at least two of said debug engines correspond to different users, said first information comprising at least some information about which portion of said target software program is currently being executed, said communicating step including the act of executing said first computer-executable instructions whereby said debug interface obtains said first information without interprocess communication.

7. The computer-readable medium according to claim 6, said method further comprising at least one of said plurality of debug engines communicating one or more debug commands to said target software program by calling said debug interface, at least one of said one or more debug commands being selected from the group consisting of: a command to resume execution of said target software program; a command to retrieve symbol information from said target software program; and a command to modify internal data of said target software program, whereby said debug interface carries out said command without performing interprocess communication.

8. The computer-readable medium according to claim 7, said command to retrieve symbol information causing an exchange of symbol table information between the target software program and at least one of said debug engines.

9. The computer-readable medium according to claim 7, said command to modify internal data causing an exchange of symbol table information between the target software program and at least one of said debug engines.

10. A method of facilitating the simultaneous debugging of a target software program by at least two users in a multiple-user environment, said target software program executing within a server process, said method comprising the acts of:

receiving, from a first client into said server process, a first request to enable a debugging mode, wherein said server process generates notifications of one or more target software program execution events while executing in said debugging mode sends said notifications to each client with respect to which said debugging mode has been enabled, said first client corresponding to a first user;

enabling said debugging mode with respect to said first client in response to said first request;

receiving, from a second client into said server process, a second request to enable said debugging mode, said second client corresponding to a second user different from said first user;

enabling said debugging mode with respect to said second client in response to said request;

executing said target software program on a first thread within said server process, wherein said first thread corresponds to said first client, wherein the act of executing said target software program on said first thread comprises issuing a call to a function which obtains first information about which portion of said target software program is currently being executed on said first thread, the issuance of the call and the obtaining of the first information occurring without interprocess communication;

executing said target software program on a second thread within said server process, wherein said second thread corresponds to said second client, wherein the act of executing said target software program on said second thread comprises issuing a call to a function which obtains second information about which portion of said target software program is currently being executed on said second thread, the issuance of the call and the obtaining of the second information occurring without interprocess communication, the execution of said target program on said second thread occurring at least in part concurrently with the execution of said target program on said first thread;

sending from said server process to said first client first notifications of events occurring during execution of said first thread, said first notifications comprising at least said first information; and sending from said server process to said second client second notifications of events occurring during execution of said second thread, said second notifications comprising at least said second information.

11. The method of claim 10, wherein each of said first and second clients comprises:

a debug engine; and a target software interface;

wherein said requests are received from each of said clients by way of their respective target software interfaces, wherein said first client's target software interface sends said first request upon instruction from said first client's debug engine, and wherein said second client's target software interface sends said second request upon instruction from said second client's debug engine.

12. The method of claim 10, wherein each of said first and second clients comprises:

a debug engine; and a target software interface;

wherein said notifications are sent to each of said clients by way of their respective debug engines.

13. The method of claim 10, wherein execution of a thread is halted upon sending of a notification to its corresponding client, and whereupon the halted thread continues execution only upon receiving a request to continue from its corresponding client.

14. The method of claim 13, further comprising the acts of:

receiving, from said first client into said server process, a request to examine at least some symbol information of said target software program;

obtaining said symbol information without performing interprocess communication; and providing the obtained symbol information to said first client in response to said request to examine;

wherein said receiving act and said providing act take place after the halting of said halted thread and before the continuation of said halted thread.

15. The method of claim 10, wherein said target software program execution events comprise events selected from the group consisting of: commencement of the execution of a procedure, execution of a step of a procedure, and exiting of the current program nest level.

16. The method of claim 10, further comprising the act of:

receiving, into said server process from a third client, a request to execute said target software program on a third thread within said server process, said third thread corresponding to said third client, wherein said third client does not request that debugging mode be enabled with respect to said third client; and executing said target software program on said third thread, wherein said notifications are not sent to said third client, by virtue of the fact that debugging mode has not been enabled with respect to said third client.

17. The method of claim 10, further comprising the acts of:

receiving, into said server process from said first client, a request to disable said debugging mode with respect to said first client; and disabling said debugging mode with respect to said first client in response to said request.

18. The method of claim 17, wherein said first client comprises:

a debug engine; and a target software interface;

wherein said request to disable said debugging mode is received by said target program from said first client by way of said target software interface, and wherein said target software interface sends said request to disable upon instruction from said debug engine.

19. A computer-readable medium having computer-executable instructions to perform the method of claim 10.

20. A computer-readable medium having computer-executable instructions to perform a method of debugging a target software program by multiple users in a multiple-user environment, said environment comprising:

a server;

a first client corresponding to a first user; and a second client corresponding to a second user different from said first user;

wherein said server comprises:

a first computing device;

a process under which a target software program to be debugged executes on said first computing device; and a server debug interface having executable instructions for communicating information about target software program execution events to said clients and for processing debugging requests from said clients, said server debug interface being within said process;

and wherein each of said clients comprises:

a second computing device which communicates with said first computing device;

a target program interface; and a debug engine;

said method comprising the acts of:

said first client's target program interface's issuing, under the direction of said first user, a first command to said process, wherein said first command instructs said process to enable a debugging mode with respect to said first client;

said second client's target program interface's issuing, under the direction of a second user, a second command to said process, wherein said second command instructs said process to enable a debugging mode with respect to said second client;

first executing said target software program on a first thread within said process, said first thread corresponding to said first client, wherein said first executing step includes issuing a call to said server debug interface whereby said server debug interface notifies said first client's debug engine of target software program execution events occurring during the execution of said first thread including at least some information about which portion of said target software program is currently being executed on said first thread, wherein no interprocess communication is used to communicate the events between said target software program and said server debug interface; and second executing said target software program on a second thread within said process, said second thread corresponding to said second client, wherein said second executing step includes issuing a call to said server debug interface whereby said server debug interface notifies said second client's debug engine of target software program execution events occurring during the execution of said second thread including at least some information about which portion of said target software program is currently being executed on said second thread, wherein no interprocess communication is used to communicate the events between said target software program and said server debug interface, and wherein said first executing step occurs at least partly concurrently with said second executing step.

21. The computer-readable medium of claim 20, said method further comprising the acts of:

said first client's debug engine communicating to said first client's target program interface an instruction to disable debugging mode; and said first client's target program interface issuing, to said target software program, a command to disable debugging mode with respect to said first client, whereupon said server debug interface ceases notifying said first client's debug engine of target software program execution events, by virtue of the fact that debugging mode with respect to said first client has been disabled.

22. The computer-readable medium of claim 20, wherein said method further comprises the acts of:

a one of said threads halting execution immediately after a notification has been sent to the halted thread's corresponding client debug engine; and the halted thread resuming execution only after said server debug interface receives an instruction to continue from the thread's corresponding client debug engine.

23. The computer-readable medium of claim 22, wherein said halted thread is said first thread, and wherein said method further comprises the act of:

during the time that execution on said first thread is halted, said first client's debug engine requesting symbolic information about said target program from said server debug interface.

24. The computer-readable medium of claim 22, wherein said method further comprises the act of:

during the time that execution on said first thread is halted, said first client's debug engine instructing said server debug interface to modify symbolic information in said target program.

* * * * *

UNITED STATES PATENT AND TRADEMARK OFFICE
CERTIFICATE OF CORRECTION

PATENT NO. : 6,219,782 B1
DATED : April 17, 2001
INVENTOR(S) : Azeemullah Khan et al.

Page 1 of 1

It is certified that error appears in the above-identified patent and that said Letters Patent is hereby corrected as shown below:

<u>Column 7,</u>
Line 36, BOOL SDIGetSYM (SFID) should be -- BOOL SDIGetSYM (SPID) --

Signed and Sealed this

Twenty-eighth Day of August, 2001

Attest:

*Nicholas P. Godici*

NICHOLAS P. GODICI
*Attesting Officer*     *Acting Director of the United States Patent and Trademark Office*